US011585510B2

(12) United States Patent
Kearns et al.

(10) Patent No.: US 11,585,510 B2
(45) Date of Patent: Feb. 21, 2023

(54) LIGHT SYSTEM INCLUDING AN ADJUSTMENT ASSEMBLY TO AIM A LIGHT

(71) Applicant: Valeo North America, Inc., Troy, MI (US)

(72) Inventors: Alexander Kearns, Auburn Hills, MI (US); Mark Singleton, Auburn Hills, MI (US); Gaurav Bhutani, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/245,554

(22) Filed: Apr. 30, 2021

(65) Prior Publication Data

US 2022/0349546 A1     Nov. 3, 2022

(51) Int. Cl.
| | |
|---|---|
| *F21S 41/675* | (2018.01) |
| *B60Q 1/068* | (2006.01) |
| *F21V 14/04* | (2006.01) |
| *B60Q 1/04* | (2006.01) |
| *B60Q 1/06* | (2006.01) |
| *B60Q 1/076* | (2006.01) |

(52) U.S. Cl.
CPC ............ *F21S 41/675* (2018.01); *B60Q 1/068* (2013.01); *F21V 14/04* (2013.01); *B60Q 1/045* (2013.01); *B60Q 1/0408* (2013.01); *B60Q 1/0425* (2013.01); *B60Q 1/0458* (2013.01); *B60Q 1/0483* (2013.01); *B60Q 1/06* (2013.01); *B60Q 1/0683* (2013.01); *B60Q 1/076* (2013.01)

(58) Field of Classification Search
CPC .... B60Q 1/0458; B60Q 1/045; B60Q 1/0425; B60Q 1/0408; B60Q 1/0483; B60Q 1/076; B60Q 1/06; B60Q 1/068; B60Q 1/0683; F21S 41/67; F21S 41/675; F21V 14/04
See application file for complete search history.

(56) References Cited

U.S. PATENT DOCUMENTS

| | | |
|---|---|---|
| 4,578,740 A | 3/1986 | Krizmanic |
| 4,843,523 A | 6/1989 | Nakamura |
| (Continued) | | |

FOREIGN PATENT DOCUMENTS

| | | | |
|---|---|---|---|
| DE | 102005007119 A1 | 9/2006 | |
| DE | 102007040728 A1 * | 3/2009 | ............ F21S 41/141 |
| (Continued) | | | |

OTHER PUBLICATIONS

International Search Report and Written Opinion for Application No. PCT/US2022/026438, dated Jul. 27, 2022, 15 pgs.

*Primary Examiner* — Colin J Cattanach
(74) *Attorney, Agent, or Firm* — Young Basile Hanlon & MacFarlane, P.C.

(57) ABSTRACT

A light system of a vehicle comprising: (a) a connector housing; (b) a reflector housing connected to the connector housing and being movable relative to the connector housing; (c) one or more adjustment assemblies comprising: (i) a socket in the connector housing; and (ii) a rod in the reflector housing that extends into the socket and is rotatable relative to the socket so that the reflector housing is adjustable relative to the connector housing; and wherein the rod has a length and a width with the length being greater than the width and the rod being rotatable around an axis of the length.

20 Claims, 10 Drawing Sheets

(56) References Cited

U.S. PATENT DOCUMENTS

| | | | |
|---|---|---|---|
| 4,916,587 A | 4/1990 | Hirose et al. | |
| 5,011,322 A | 4/1991 | Schauwecker | |
| 5,067,052 A | 11/1991 | Suzuki et al. | |
| 5,365,415 A | 11/1994 | Schmitt et al. | |
| 5,526,238 A | 6/1996 | Van Oel et al. | |
| 5,993,032 A | 11/1999 | Herbers | |
| 6,923,562 B2 | 8/2005 | Leathley et al. | |
| 6,974,231 B2 | 12/2005 | Burton | |
| 7,182,491 B2 | 2/2007 | Cajanek et al. | |
| 7,500,768 B2 | 3/2009 | Chen | |
| 2004/0090786 A1* | 5/2004 | Floyd | B60Q 1/06 362/460 |
| 2008/0089085 A1* | 4/2008 | Popelek | F21S 41/675 362/345 |
| 2014/0321144 A1 | 10/2014 | Sieme | |
| 2016/0368412 A1* | 12/2016 | Shibata | F21S 45/48 |

FOREIGN PATENT DOCUMENTS

| | | | | |
|---|---|---|---|---|
| EP | 0605172 A2 * | 7/1994 | | |
| EP | 2279906 A1 * | 2/2011 | | B60Q 1/0408 |
| EP | 3626533 A1 * | 3/2020 | | |
| FR | 2845444 A1 * | 4/2004 | | B60Q 1/0683 |
| FR | 3048655 A1 | 9/2017 | | |
| JP | 2000062526 A * | 2/2000 | | B60Q 1/0683 |
| WO | WO-2018050624 A1 * | 3/2018 | | B60Q 1/06 |
| WO | WO-2020182533 A1 * | 9/2020 | | B60Q 1/068 |

* cited by examiner

US 11,585,510 B2

LIGHT SYSTEM INCLUDING AN ADJUSTMENT ASSEMBLY TO AIM A LIGHT

FIELD

The present teachings relate to a light system including a reflector housing with a pivot rod that allows a reflector housing to be adjustable relative a connector housing so that the light system is adjustable.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice of surrounding drivers. Attempts are made to make each light identical so that once inserted into a vehicle the lights are properly aimed; however, some fine adjustment may be needed to properly align the light.

Examples of light systems may be disclosed in U.S. Pat. Nos. 4,578,740; 4,843,523; 4,916,587; and 5,067,052 all of which are expressly incorporated herein by reference for all purposes. Thus, there is a need for a light system where the light system is adjustable in a first direction, a second direction, or both. There is a need for a system where an adjustment device maintains a set position when the system is aligned. It would be desirable to have an adjustment assembly that includes one or more rods that are fixed within a socket.

SUMMARY

The present teachings provide: a light system of a vehicle comprising: (a) a connector housing; (b) a reflector housing connected to the connector housing and being movable relative to the connector housing; (c) one or more adjustment assemblies comprising: (i) a socket in the connector housing; and (ii) a rod in the reflector housing that extends into the socket and is rotatable relative to the socket so that the reflector housing is adjustable relative to the connector housing; and wherein the rod has a length and a width with the length being greater than the width and the rod being rotatable around an axis of the length.

The present teachings provide a light system where the light system is adjustable in a first direction, a second direction, or both. The present teachings provide a system where an adjustment device maintains a set position when the system is aligned. The present teachings provide an adjustment assembly that includes one or more rods that are fixed within a socket.

DETAILED DESCRIPTION

Figure 1:
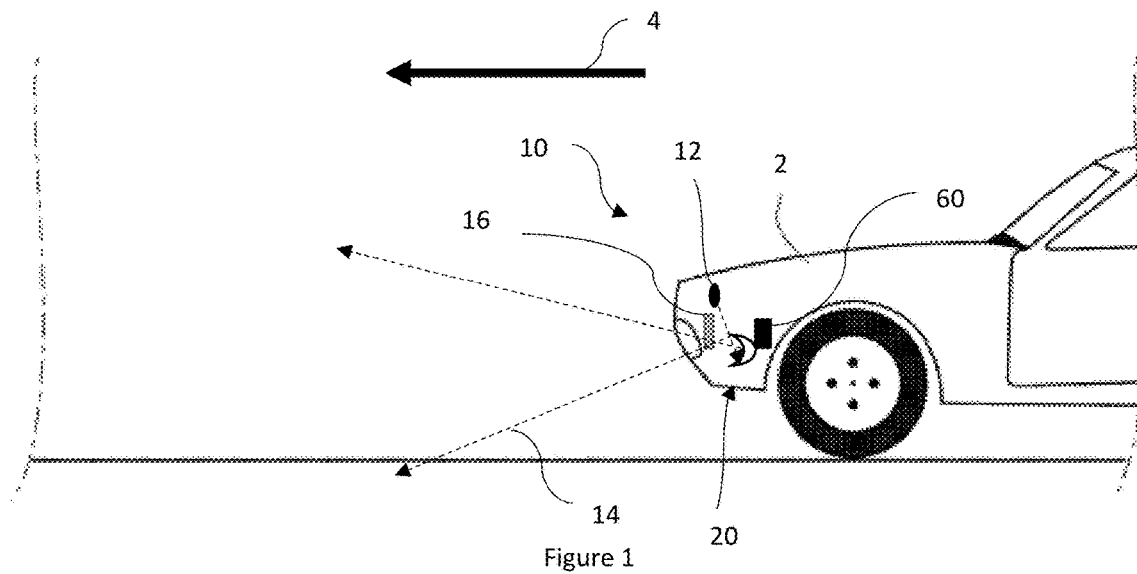
FIG. 1 is a side view of a vehicle including the light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination thereof. Preferably, the light system projects a light from an external surface of the vehicle to a location in front of the vehicle or at an angle relative to the front of a vehicle. The light system may direct some light at the ground. The light system may direct some light above the ground. The light system may be integrated into a front end, a rear end, or both of a car. The light system may project light out of the vehicle. The light systems may be multiple light systems stacked one above the other or integrated into a single light system. The light of the vehicle may be two or more, three or more, or four or more light systems located one above another. The light system may have a high beam and a low beam. A total height of the light systems may be decreased by placing all of the light sources in a single plane or on a same plane.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a first light guide). The light source may be directional light. The light source may have an emission that is a Lambertian emission or a narrow emission angle. The directional light source may concentrate light on a light guide, towards a light bar, a reflector, or a combination thereof. The light source may include a laser diode, glowing phosphor, filament bulb, a light emitting diode, a halogenated light, an xenon light, or a combination thereof. The light source may create a cone of light with an optical axis. The optical axis may be directed at a light guide, a reflector, away from a vehicle, or a combination thereof.

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes two or more, 3 or more, 4 or more, or 5 more light sources that produce light and combine together to form the light extending from the light system. The sets of light source may include 50 or less, 35 or less, 20 or less, or 15 or less devices that produce light (e.g., each set may include 5 light sources or alternatively all of the sets when combined together may include 5 light sources). For example, the set of light sources may be the contents of a single printed circuit board that perform a same lighting function and the set of light sources may be 5 light sources. The set of light sources may be all of the light sources on all of the printed circuit boards that create a same lighting function and may be 15 light sources. For example, there may be 30 total light sources, but only 15 perform a same function and those may be a set of light sources. The light source may be static. Preferably, a single light source will be directed at a single reflector. The light sources may be free of movement. The light source may be fixed or may be fixed relative to a reflector or a reflector housing. The light sources may be static and may be manually or physically adjusted so that the light sources are directed to a desired location. Adjusting a reflector housing may adjust the light sources. The light sources may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light.

Each of the set of light sources may direct light on a first side and a second side of an optical axis. Some of the light may extend on an inboard side of the optical axis (e.g., in a direction towards a center of a vehicle). The light functions to illuminate a region around a vehicle so that an operator may view surroundings. Some of the light may extend on an outboard side of the optical axis (e.g., in a direction away from a center of a vehicle). The light may extend farther on an outboard side than an inboard side of a light. The light on the inboard side may illuminate a region between two light sources and in front of a vehicle. A right-handed light and a left-handed light may each include light that extends inboard (e.g., on an inboard side) so that the inboard lights overlap and illuminate in front of a vehicle. A right-handed light and a left-handed light may each include light that extends outboard (e.g., on an outboard side) of a vehicle so that the outboard light illuminates a region outside of the vehicle, sides of a road, or both. The light from each of the light sources may extend outward from the light source at an angle towards an inboard side and an outboard side. The light extending on the inboard side may extend outward from the light source, vehicle, or both at an angle of about 10 degrees or more, about 20 degrees or more, about 25 degrees or more, or about 30 degrees or more relative to the optical axis. The light extending on the inboard side may extend outward from the light source, the vehicle, or about at an angle of about 50 degrees or less, about 40 degrees or less, or about 35 degrees or less relative to the optical axis. The light extending on the outboard side may extend outward from the light source, vehicle, or both at an angle of about 20 degrees or more, about 30 degrees or more, about 35 degrees or more, or about 40 degrees or more relative to the optical axis. The light extending on the outboard side may extend outward from the light source, the vehicle, or about at an angle of about 60 degrees or less, about 50 degrees or less, or about 45 degrees or less relative to an optical axis. An angle the light extends on an inboard side and an outboard side of the optical axis may be varied based on a shape of a reflector. The light may be generated by the light sources and be directed into a reflector that directs the light through a lens.

The lens functions to form an outermost surface of a light system. The lens may aim light. The lens may reflect or refract the light. The lens may protect the light system. The lens may be clear. The lens may be located over or proximate to a reflector housing.

The reflector housing functions to direct or redirect light from a light source to a location external of the light system, vehicle, or both. The reflector housing may be aimed. The reflector housing may be sized and shaped to direct light to a predetermined region or location. The reflector housing may be connected to a connector housing. The connector housing may connect the reflector housing within a vehicle. The reflector housing may contain the light source or house the light source. The reflector housing may be moved about 1 or more locations, two or more locations, three or more locations, or even four or more locations. The locations may be a rod, a ball, a socket, a connector housing, a pivot member, or a combination thereof. Preferably, one or more locations are a rod and more preferably two or more locations are rods. The locations may be in line with one another or within a plane. The locations may form a triangle, a square, a rectangle, or a combination thereof. The reflector housing may include a primary reflector surface, a secondary reflector surface, or both.

The reflector surfaces (e.g., primary or secondary) redirect light away from the vehicle, the light source, or both. The reflector surface may be a metalized plastic that reflects light. The reflector surface may include one or more reflector facets and preferably a plurality of reflector facets. The reflector surfaces may direct a running light, a low beam, a high beam, or a combination thereof. Preferably, the primary reflector surface directs a running light or a low beam and the secondary reflector surface directs a high beam of light. The reflector surfaces may have a pre-aim or aimed configuration relative to the connector housing when the reflector housing and the connector housing are mated together. The reflector surfaces may be moved by an adjustment assembly so that the reflector surfaces direct light to a predetermined direction.

The adjustment assembly functions to move or permit a reflector housing, a connector housing, or both to move. The adjustment assembly may move in a first direction, a second direction, or both. The adjustment assembly may rotate about an x-axis, y-axis, or both. The adjustment assembly may rotate only about a single axis. The adjustment assembly may be rotatable about two axes. The adjustment assembly may be moved about 1 cm or less, about 8 mm or less, about 5 mm or less, about 3 mm or less. The adjustment assembly may be moved about 0.01 mm or more, about 0.1 mm or more, about 0.5 mm or more, or about 1 mm or more. The adjustment assembly may include or be a rod, a pivot member, or both.

The rod function to rotate about one or more axes. Preferably, the rod rotates about a single axis. The axis of the rod may extend along a length of the rod. The rod may extend cantilever from the reflector housing, be part of the reflector housing, be a monolithic part of the reflector housing, connect to the reflector housing at a first end, connect to a support bridge at a second end, or a combination thereof. The rod may have a cross-sectional shape. All or a portion of the cross-section of the rod may be circular, oval, tear dropped, symmetrical, asymmetrical, or a combination thereof. The rod has a length and a width. The length is a major dimension of the rod. The width is a minor dimensions of the rod. The length may be in an axial direction of the rod. The length may be a direction that extends from the reflector housing, to a support bridge, or both. The length may form an axis of rotation. The width may be a cross-sectional length of the rod. The width may be an amount of the rod that extends into the socket. The width may be a portion of the rod without the ribs. The rod may have a length to width ratio. The length to width ratio may be 1:1 or more, 1.5:1 or more, 2:1 or more, 3:1 or more, 4:1 or more, or even 5:1 or more. The length to width ratio may be 10:1 or less, 8:1 or less, or about 6:1 or less. The rod may be cylindrically shaped, "C"-shaped, or both. The rod may include an insertion member, insertion edges, steps, ribs, pivot member, or a combination thereof.

The support bridge functions to support an end of the rod. The support bridge may connect to a second end of the rod. The support bridge may prevent the rod from being cantilever. The support bridge may prevent the socket from sliding off the rod. The support bridge may prevent the rod from moving or breaking when the rod is inserted into the socket. The support bridge may extend over the rod and only contact the rod at a single location. The support bridge may extend over the rod so that the rod and socket may connect together. The support bridge may have a portion that extends parallel to the rod, a portion that extends perpendicular to the rod, or both. The support bridge may have a thickness that is substantially equal to a width of the rod. The support bridge may have a thickness that is less than the width of the rod. The support bridge may include one or more ribs. The support bridge may act as a bridge. The support bridge may reinforce a second end of the rod. The support bridge may be a monolithic part of the reflector housing, the rod, or both. The support bridge may extend over the rod so that an opening is formed between the rod and the support bridge.

The opening functions to permit all or a portion of a socket to extend around the rod. The opening may assist in forming a connection. The opening may be substantially equal to a length of the rod, a length of a socket, or both. The opening may be located above a rod, below a rod, or both above and below a rod. The opening may be shaped similar to the socket, a square, rectangle, triangle, a polygon, a geometric shape, a non-geometric shape, symmetrical, asymmetrical, or a combination thereof. The opening may guide the socket around the rod. The opening may permit a socket to extends around the rod as the insertion member extends into the socket.

The insertion member functions to guide the rod into the socket so that the reflector housing is connected to the connector housing. The insertion member may be a forward portion of the rod. The insertion member may be tapered so that as the rod extends into the socket the rod may move in the first direction but once seated be restricted from moving in a second direction. The insertion member may be the body portion of the rod. The insertion member may be flexible. The insertion member may be rigid. The insertion member may be more flexible than the socket so that the insertion member conforms to the socket when a connection is being formed; the insertion member may be more rigid than the socket so that the socket conforms to the insertion member as a connection is being formed; or both may have some elasticity so that both the insertion member and the socket move to assist in forming a connection. The insertion member may have one or more forward edges that assist in forming a connection. The rod may include two insertion members and the insertion members may be spaced apart by a bis region. The forward edges of the insertion member may be insertion edges.

The insertion edges function to guide the rod into a connection with a socket. The insertion edges may have a small area to initially extend into a receptacle within the socket. For example, the insertion edges may be tapered so that the insertion edges extend into a leading side of the socket and then guide the rod into the socket. The insertion edges may be a tapered surface that compresses all or a portion of the rod, spreads all or a portion of the socket, or both. The insertion edges may be a plurality of insertion edges. The insertion edges may be two insertion edges. The insertion edges may move relative to one another. The insertion edges may bias a biasing region so that the insertion edges are movable. The insertion edges may be a first portion of the rod that extends into the socket. The insertion edges may be cantilevered so that the insertion edges may be flexed as the rod extends into the socket. The insertion edges may be located on an opposite side of the rod or insertion member as the rotation stops, steps, or both.

The rotation stops function to allow some movement of the rod relative to the socket, but to limit an amount of rotational movement. The rotation stops may contact a flexible tab of the socket. The rod may include a plurality of rotation stops. The rod may include one rotation stop for each jaw of a socket. The rod may include two adjacent rotation stops. The rod may include rotation stops on opposing sides of a rib, a bis region, or both. The rotation stops may be spaced apart from one or more of the flexible tabs. The rotation stops may be one side of an absence of material. The rotation stop may be a flat wall that is cut or formed into a wall of the rod. The wall of the rotation stop may have a shape. The shape of the wall may be round, rounded, arcuate, concave, convex, triangular, have an apex, have a valley, or a combination thereof. The rotation stops may permit the rod to rotate a distance of about 3 mm or less, 2 mm or less, 1 mm or less, 0.5 mm or less, or about 0.25 mm or less. The rotation stops may permit the rod to rotate about 0.01 mm or more, about 0.05 mm or more, about 0.1 mm or more, or about 0.2 mm or more. The rotation stops be one side of an absence of material. The rotation stops may be located adjacent or opposite, work in conjunction with, or both one or more steps.

The one or more steps function to form an absence of material, a region that a flex tab extends into, or both. The one or more steps may be located adjacent to a rotation stop. The one or more steps may assist in restricting movement of the rod relative to a socket. The one or more steps may be a plurality of steps. The one or more steps may extend at an angle relative to the rotation stops. The step and the rotation stops may extend at a right angle. There may be an equal number of steps and rotation stops. The steps and rotation stops may have a same size and shape. The steps may be round, rounded, arcuate, concave, convex, triangular, have an apex, have a valley, or a combination thereof. The steps may restrict movement of the rod in a first direction and the rotation stops may restrict movement in a second direction. The steps may permit the rod to rotate a distance of about 3 mm or less, 2 mm or less, 1 mm or less, 0.5 mm or less, or about 0.25 mm or less. The steps may permit the rod to rotate about 0.01 mm or more, about 0.05 mm or more, about 0.1 mm or more, or about 0.2 mm or more. The steps and rotation stops may be on a rear side of the rod so that when the rod is fully inserted into the socket a portion of the socket seats between the steps and rotation stops preventing the rod from being removed from the socket but allowing for rotational adjustment of the rod relative to the socket. The steps, rotation stops, or both may be located proximate to, on opposing sides of, all on one side of, or a combination thereof one or more ribs.

The ribs function to prevent or limit biasing of the rod when the rod is being inserted into the socket or when a connection is being formed (e.g., move a braced portion a distance of 1 mm or less, 0.5 mm or less, or 0.25 mm or less). The ribs may be located on an insertion side, a rear side, or both of a rod. The ribs may be located on a top, bottom, front, back, or a combination thereof. The ribs may be compressed when the rod is extending into the socket such that the rod is prevented from deflecting by the ribs (e.g., the rib may push against a rear side of the rod). The ribs may be placed in tension when the rod is extending into the socket (e.g., the rib may pull against the rod). The ribs may prevent deflection. The ribs may support the rod. The ribs may be triangular in shape. The ribs may be part of the support bridge, connect to the support bridge, extend between the rod and the support bridge, or a combination thereof. The ribs may be a monolithic part of the rod, the reflector housing, or both. The ribs may allow some portions of the rod to bias and other portions of the rod to be prevented from biasing. The ribs may allow for some regions proximate to a bias region to bias while other portions are prevented from biasing.

The bias regions function to assist in forming a connection, preventing removal, or both. The bias regions may be an absence of material, a weakened region, or both. The bias regions may be on an insertion side. The bias regions may assist the insertion edges to enter into a receptacle of the socket. The bias regions may elastically deform. The bias regions may allow a portion of the insertion members to flex while the rod is entering a receptacle and then to spring back into shape once the rod is located within the receptacle. The bias regions may assist in fully seating the rod within the socket by deforming (e.g., going back to an original shape) and moving the rod into a seated position. The bias regions may move the insertion members into contact with a seat (e.g., an upper seat, a lower seat, a rear seat). The bias region may assist in rotationally moving, axially moving, or both a rod with respect to a socket. The bias regions may prevent the rod or a pivot member from being removed from a socket once a connection is formed. The bias regions may bias a rod, a pivot member or both.

A pivot member functions to allow an adjustment assembly to be adjusted more than one direction (e.g., two or more directions, three or more directions, or four or more directions). The pivot member may be part of a rod. The pivot member may be connected to or formed on the rod. The pivot member may be a monolithic part of the rod. The pivot member may be an increased cross-sectional thickness of the rod. The pivot member may be a circular member, round member, spherical, diamond, have rounded edges, or a combination thereof. The pivot member may be located in a center or central region of a rod. The pivot member may allow the socket to be adjusted angularly relative to the rotational axis of the rod (e.g., so that an axis of the rod and an axis of the socket are not parallel). The pivot member may be a pivot point for the socket. The rod may support the picot member. The pivot member may be free of a connection with the rod. The pivot member may be spaced apart from a rod. A device may include one or more rods with pivot members, one or more separate pivot members, one or more separate rods, or a combination thereof. The device may include a plurality of rods, a plurality of pivot members, or both. The pivot member may allow a movement assembly to move a rod, an adjustment assembly, or both in a second direction in addition to the first direction the rod permits rotation.

The movement assembly functions to adjust the adjustment assembly, move a rod, a pivot member, or both relative to a socket. The movement assembly may adjust orientation of the adjustment assembly and then maintain the orientation. The movement assembly may adjust about 1 or more axes, 2 or more axes, or even three or more axes. Each movement assembly may adjust a single axis. If there is one movement assembly then only one axis may be adjusted or if there are two movement assemblies then two axis may be adjusted. A portion of the movement assembly may be part of the reflector housing. The movement assembly may extend between the reflector housing and the connector housing. The movement assembly may contact the connector housing to adjust the reflector housing. The movement assembly may include an adjustment device that moves an adjustment device to adjust the reflector housing.

The adjustment device functions to move a movement member so that the reflector housing is moved, adjusted, retained in place, or a combination thereof. The adjustment device may be adjustable by a hand, a tool, a screwdriver, a socket, a wrench, or a combination thereof. The adjustment device may rotate a movement member, axially move a movement member, or both. The adjustment device may move to move the adjustment device but may be free of axial movement. The adjustment device may axially move with the movement member. The adjustment device may extend out of a movement assembly or be recessed within a movement assembly. The adjustment device may rotate the movement member, lock the movement member in a position, or both.

The movement member functions to move a reflector housing relative to a connector housing. The movement member may convert rotational movement to axial movement. The movement member may be a detent and move axially without rotationally moving. The movement member may be smooth, threaded, include one or more detents, or a combination thereof. The movement member may be axially moved so that the reflector housing is rotated about a rod, a pivot member, or both. The movement member may extend through the reflector housing, rotate relative to the reflector housing, rotate relative to the connector housing, extend through the connector housing, or a combination thereof. The movement member may extend from the connector housing into contact with the reflector housing or from the reflector housing into the contact with the connector housing.

The connector housing functions to connect a light system to a vehicle. The connector housing may attach to a vehicle frame, a panel, an internal component, or a combination thereof. The connector housing may be connected to the vehicle at two or more locations. The connector housing may ground the light system within the vehicle. The connector housing may be made of or include plastic, metal, aluminum, polycarbonate, or a combination thereof. The connector housing may be attached to a vehicle and include one or more sockets.

The sockets function to movably connect a reflector housing to a connector housing. The sockets function to movably receive a rod, a pivot member, or both. The sockets include one or more receptacles that receive all or a portion of a rod, a pivot member, or both. The sockets may be a female piece of a connector housing that receives a male piece of a reflector housing or vice versa. The socket may be a monolithic part of the connector housing. The socket may be formed and then connected to the connector housing. The socket may be formed of an elastically deformable material. The socket may be formed of a plastically deformable material. The socket may be formed of a rigid material. The socket may have some flexibility but may be substantially rigid to maintain a connection between a rod, a pivot member, or both. The socket may be formed of metal, plastic, a polycarbonate, polyethylene, polypropylene, polyethylene terephthalate, polystyrene, or a combination thereof. The socket may include two or more jaws that receive all or a portion of a rod, a pivot member, or both.

The jaws (e.g., upper jaw and lower jaw) function to connect the socket to a rod, a pivot member, or both. The jaws may extend cantilever. The jaws may form a "U" shape, a "C" shape, or both. The jaws may be located adjacent one another. The jaws may be spaced apart. The jaws may be a mirror shape to one another. The jaws may extend parallel to one another. The jaws may be an upper jaw and a lower jaw that are spaced apart by a receptacle.

The receptacle functions to receive all or a portion of a rod, a pivot member, or both. The receptacle may be an open space. The receptacle may be an absence of material. The receptacle may receive all of a rod, a movement member, or both and lock the rod, the movement member, or both within the receptacle. The receptacle may allow the jaws to bias. The receptacle may include seats.

The seats (e.g., upper seat, lower seat, rear seat) function to retain the rod, the movement member, or both within the receptacle and allow some movement of the rod, the movement member, or both. The seats function to contact a portion of the rod, the movement member, or both and restrict the rod, the movement member, or both within the receptacle. The seats may have a shape that mirrors a shape of the rod, the movement member, or both. The seats may have a rounded surface, a curved surface, be arcuate, or a combination thereof. The seats may be spaced apart. The seats may be located on jaws, adjacent the jaws, or both. The seats may allow the rod, the movement member, or both to move in a single direction (e.g., in a first direction and prevent movement in a second direction). All or some of the seats may be located 30 degrees or more, 45 degrees or more, 60 degrees or more, or 90 degrees or more apart. All or some of the seats may be 180 degrees or less, 120 degrees or less, or about 90 degrees or less apart. The seats may be spaced apart by a flex cavity, flex region, or both.

The flex cavity may permit the jaws to move relative to the seats and preferably the rear seats. The flex cavity may allow the jaws to flex to receive the rod, the movement member, or both. The flex cavity may be an absence of material between rear seats. The flex cavity may be free of contact with the rod, the movement member, or both. The flex cavities may permit some movement of the jaws and the flex regions may provide some movement to the jaws.

The flex cavities function to permit an upper seat, a lower seat, a flex tab, or a combination thereof to move so that the rod, the movement member, or both extend into the receptacle. The flex cavities may allow a flex tab to extend outward to receive the rod, the movement member, or both. The flex cavities may be located between a body of the arm and a tip of the arm. The flex cavities may be triangular in shape, oval, have a pointed area, or a combination thereof. The flex cavities may allow the top seat, the bottom seat, the flex tabs away from each other when the rod, the movement member, or both extend into the receptacle and then elastically deform to seat the rod, the movement member, or both within the receptacle. The flex tabs may guide the rod, the movement member, or both into the seats.

The flex tabs may function to move the rod, the movement member, or both into a seat; restrict movement of the rod, the movement member, or both in a first direction or a second direction; to move a portion of the jaws; or a combination thereof. The flex tabs may be a tip of the jaws. The flex tabs may provide leverage so that the rod, the movement member, or both move the jaws to seat within the receptacle. The flex tabs may extend outward from the jaws so that the jaws are moved. The flex tabs may bias towards the jaws to permit entry of the rod, the movement member, or both into the receptacle. The flex tabs may bias outward and then deform back once the rod, the movement member, or both are seated. The flex tabs act to flex an end of the jaws inward to seat the rod, the movement member, or both and once in the sears an anti-retraction tab prevents the rod, the movement member, or both from moving in a second direction.

The anti-retraction tab functions to limit the rod, the movement member, or both from being removed from the receptacle; assists in seating the rod, the movement member, or both; a combination of both. The anti-retraction tab fits between a rotation stop and step. The anti-retraction tabs contact the step to prevent the rod, the movement member, or both from being removed or moving in a second direction. The anti-retraction tab fits between the step and the rotation stop to allow for some rotational movement. The anti-retraction tab may lock the socket and rod together. The anti-retraction tab may be located on an opposite side of a seat as a flex tab. The anti-retraction tab may be an apex, come to a point, have line contact with a rod, or a combination thereof. The anti-retraction tab may prevent the rod from moving out of the receptacle while allowing some rotational movement of the rod.

FIG. 1 illustrates a vehicle 2 facing a direction of movement 4. The vehicle 2 includes a light system 10 having a light source 12 that directs light to a reflector housing 20 that is connected to the vehicle 2 by a connector housing 60. The reflector housing 20 aims the light 14 from the light source 12 through a lens 16 so that the light 14 illuminates a region around the vehicle 2.

Figure 2:
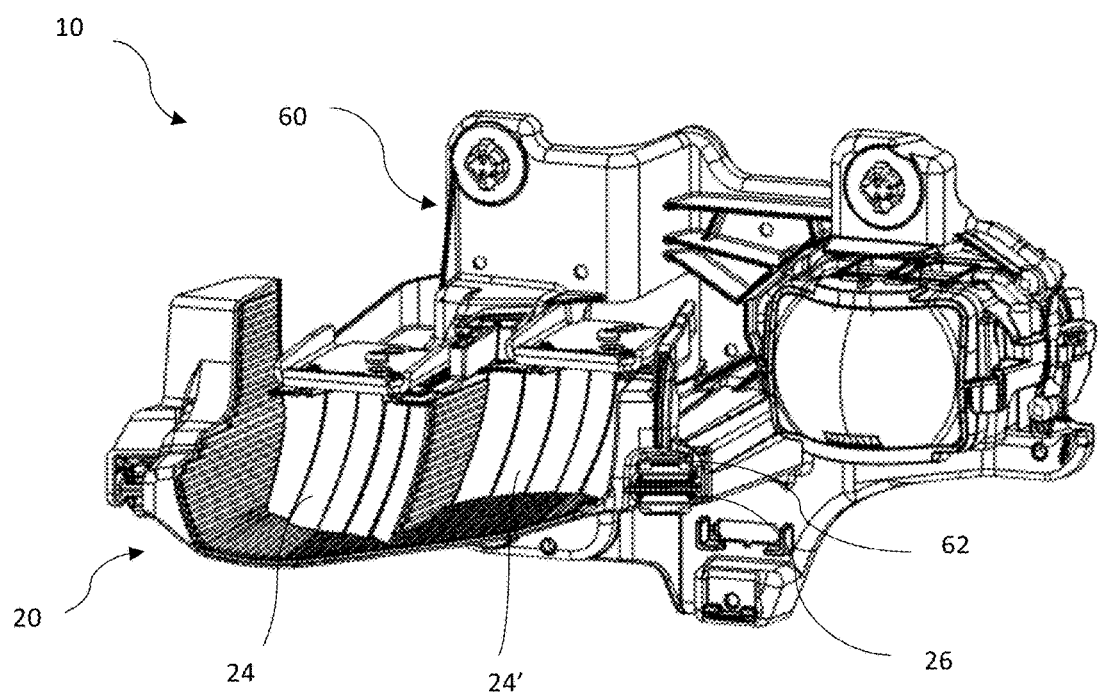
FIG. 2 is a front perspective view of a light system.

FIG. 2 illustrates a close-up perspective view of the light system 10. The light system includes a connector housing 60 that connects a reflector housing 20 within a vehicle. The connector housing 60 includes sockets 62 on opposing sides. Each socket 62 receives a rod 26 of the reflector housing 20 so that the reflector surfaces 24, 24' are retained in place and aimed at a predetermined location. The reflector surface 24 is a primary reflector surface and the reflector surface 24' is a secondary reflector surface.

Figure 3:
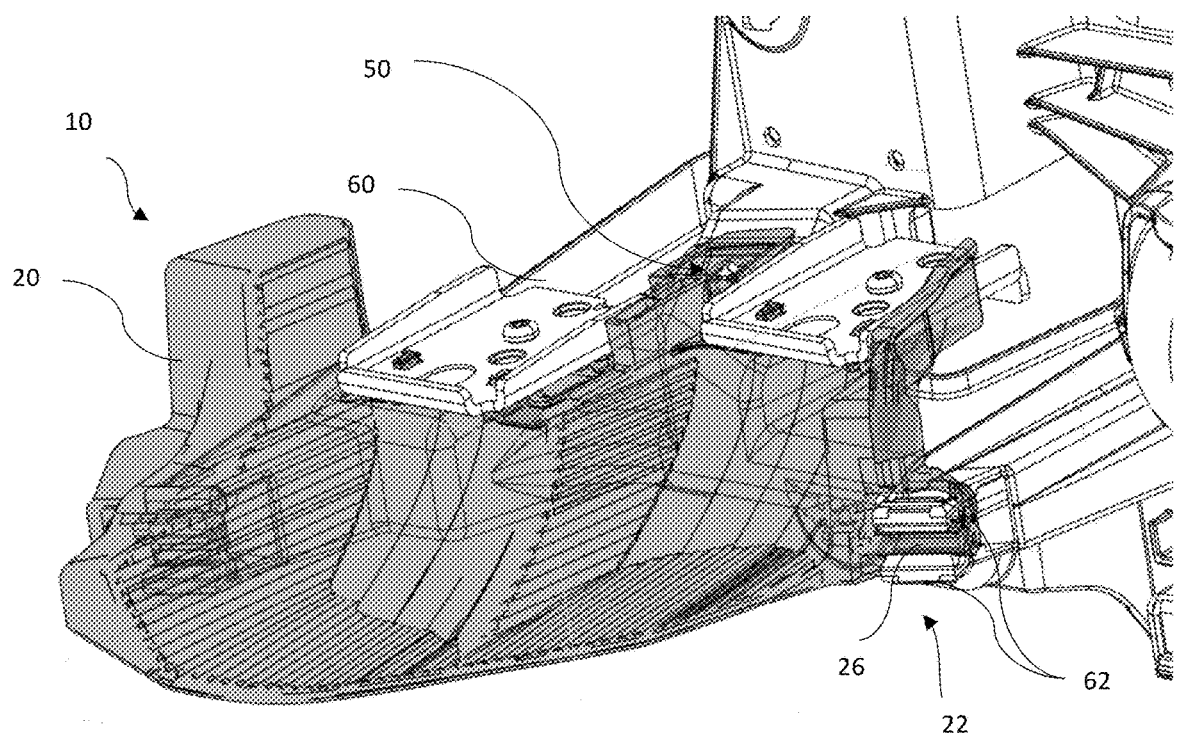
FIG. 3 is a front perspective view of the light system with a reflector housing shown in transparent.

FIG. 3 is a front perspective view of the light system 10 with the connector housing 60 shown in transparent so that a connection of the socket 62 and rod 26 of the adjustment assembly 22 is visible. The light system 10 includes a movement assembly 50 that adjusts the angle of the reflector housing 20 by rotating the bar 26 inside of the socket 62.

Figure 4:
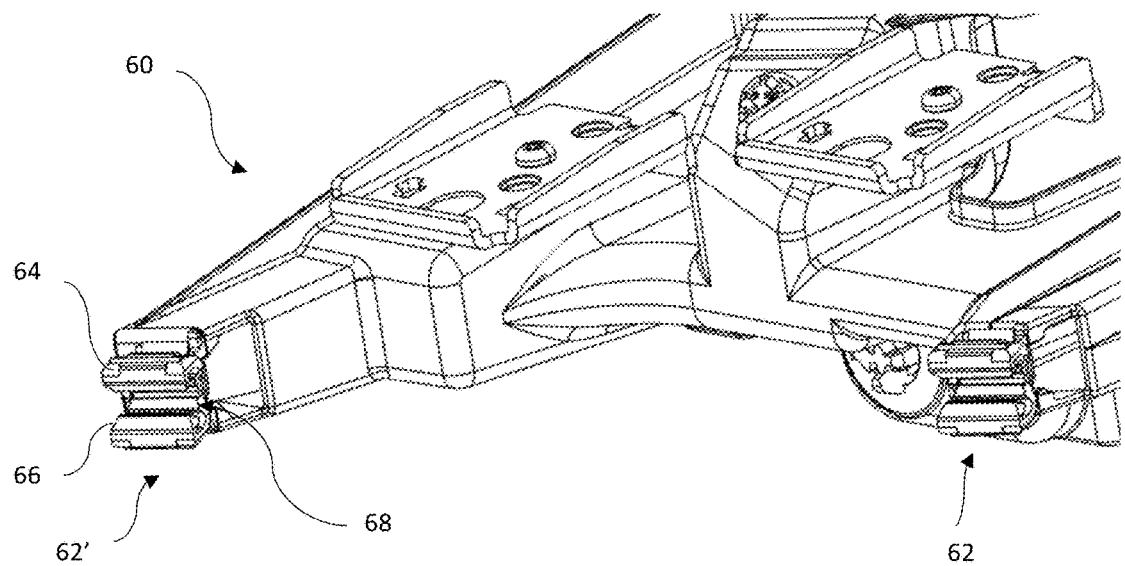
FIG. 4 is a close-up view of a portion of a connector housing.

FIG. 4 illustrates the two sockets 62, 62' of the connector housing 60. The sockets 62, 62' each include an upper jaw 64 and a lower jaw 66 that lead into a receptacle 68 that receives and holds a rod (not show).

Figure 5A:
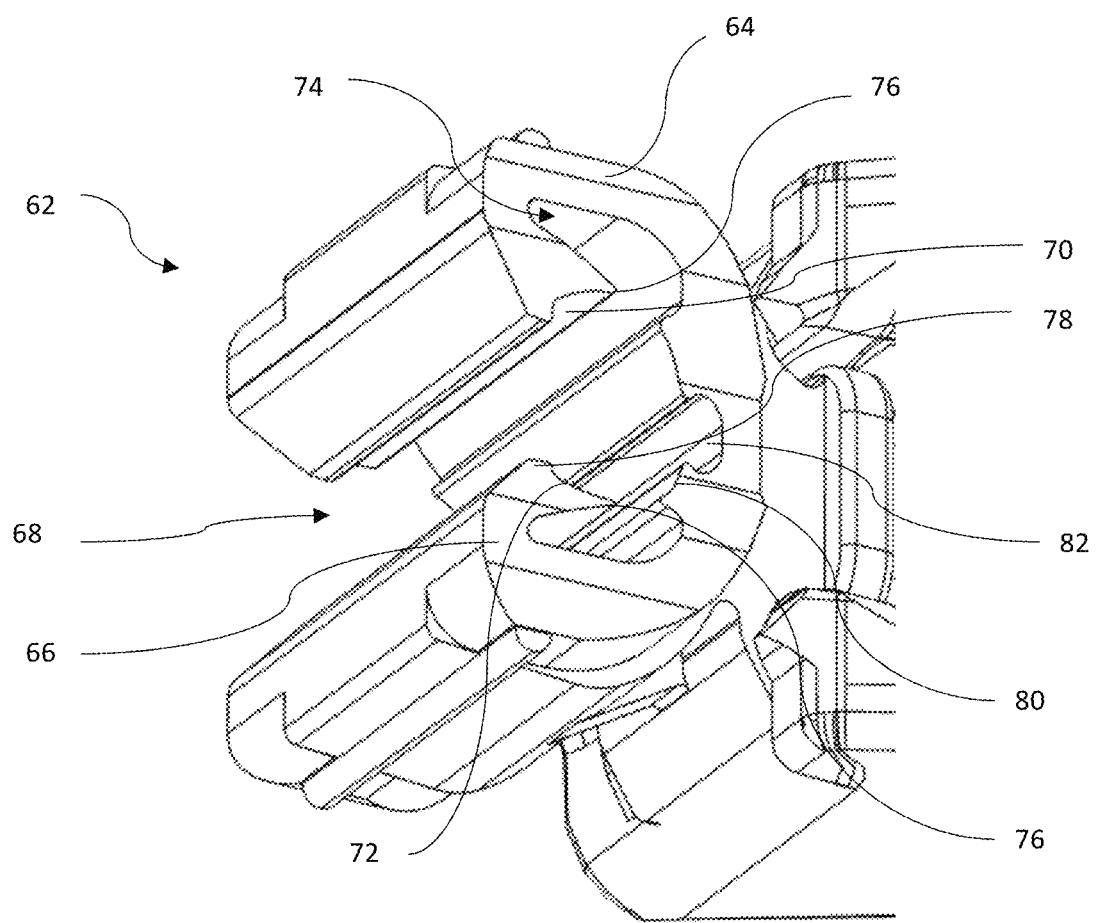
FIG. 5A is a close-up view of a socket.
Figure 5B:
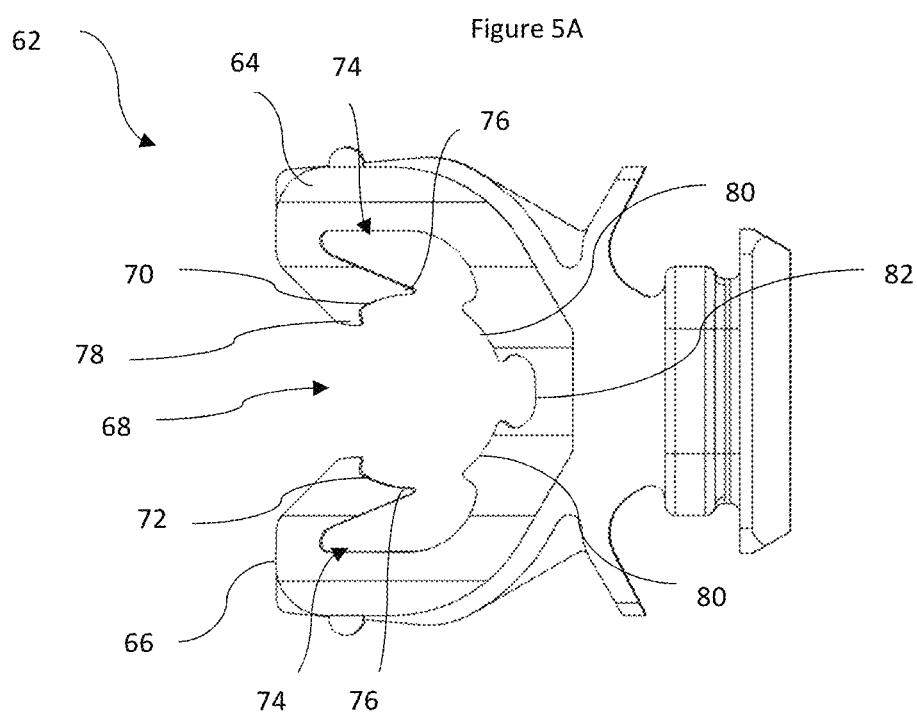
FIG. 5B is a side view of a socket.

FIGS. 5A and 5B are a front perspective view and side view of a socket 62 respectively. The socket 62 includes an upper jaw 64 and a lower jaw 66 that are mirror images of one another and form a receptacle 68 there between. The upper jaw 64 includes an upper seat 70 and the lower jaw 66 includes a lower seat 72 that contact the rod (not shown) when the rod is inserted into the receptacle 68. A flexible region 74 is located between the upper seat 70 and lower seat 72 respectively so that as the bar (not shown) extends into the receptacle 68 and contacts the flex tab 76 the flex tab 76 may move so that the rod fits within the upper seat 70 and the lower seat 72. An anti-retraction tab 78 is located on an opposite side of the seats 70, 72 from the flex tab 76 so that once the rod is located within the upper seat 70 and lower seat 72 the rod is prevented from being removed from the receptacle 68. Once the rod (not shown) is within the receptacle 68 the rod will be seated in the upper seat 70, the lower seat 72, and rear seats 80 located on opposite sides of a flex cavity, and the rod will have some ability to be rotated but will be constrained by the seats 70, 72, and 80 and the flexible tabs 76.

Figure 6:
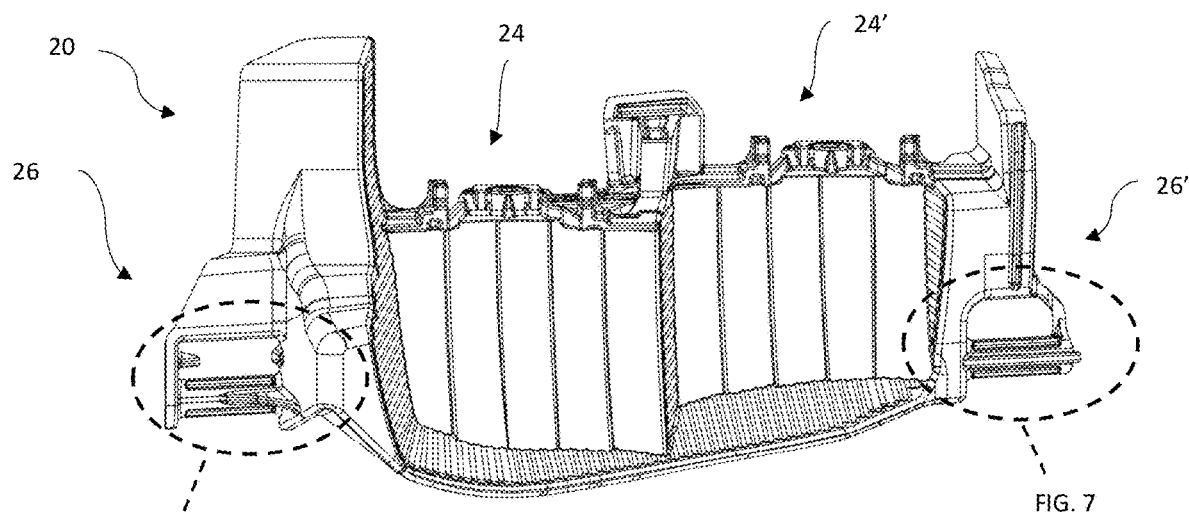
FIG. 6 is a font view of a light system.

FIG. 6 is a front view of the reflector housing 20. The reflector housing 20 has a primary reflector surface 24 located proximate to a first rod 26 and a secondary reflector surface 24' proximate to a second rod 26'.

Figure 7:
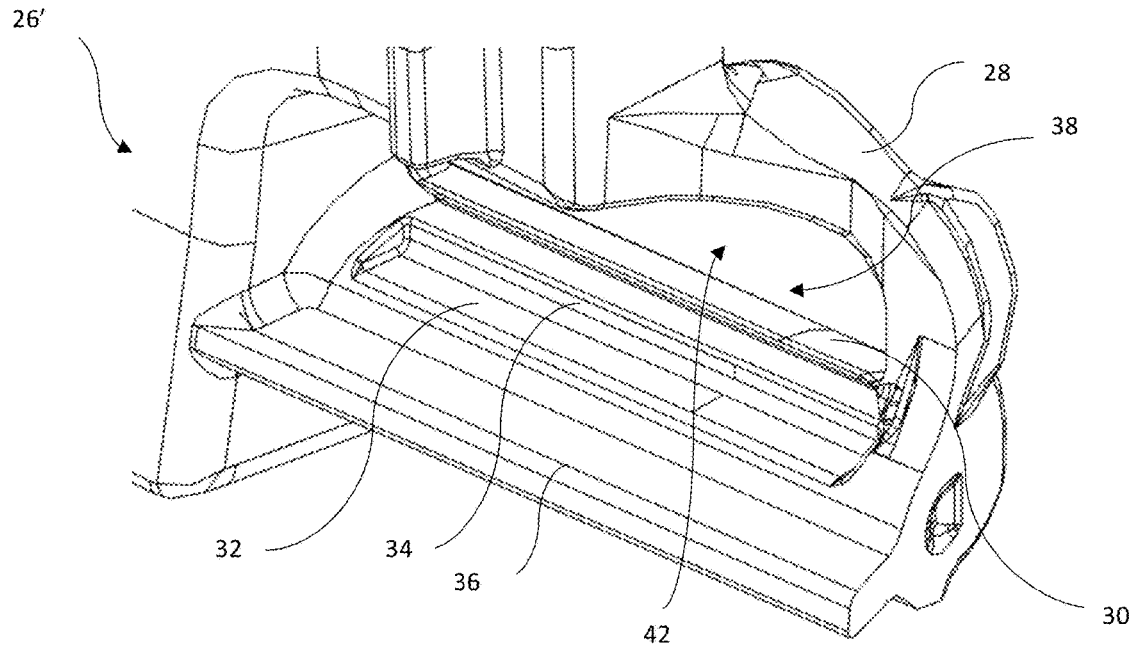
FIG. 7 is a close-up rear perspective view of a pivot rod of FIG. 6.

FIG. 7 is a close-up view of the second rod 26' of FIG. 6. The second rod 26' includes a support bridge 28 connected to the insertion member 30 and forming an opening 42 therebetween. The insertion member 30 includes an insertion edge 38 on a first side and a rotation stop 32, step 34, and rib 36 on a second side. The insertion edge 38 leads the rod into the socket until the socket (not shown) drops off the step 34 to the rotation stop 32.

Figure 8:
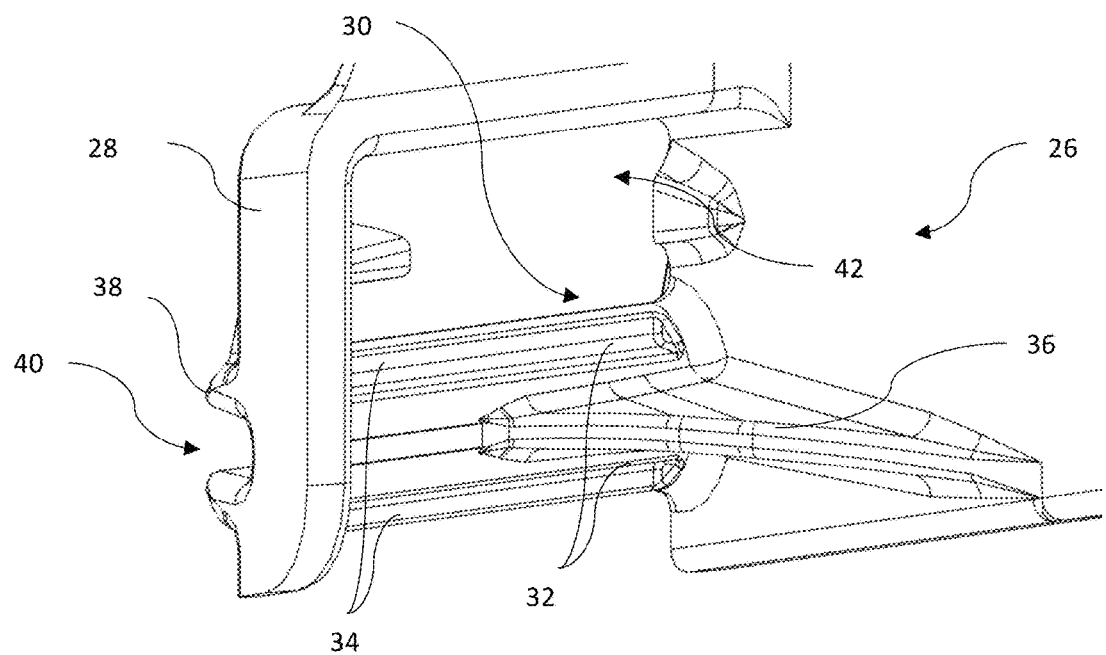
FIG. 8 is a close-up rear perspective view of a pivot rod of FIG. 6.

FIG. 8 is a close-up view of a rear side the first rod 26. The first rod 26 includes a support bridge 28 supporting the insertion member 30 and forming an opening 42 therebetween. A rib 36 supports a rear side of the insertion member 30 so that as the insertion member 30 extends into a socket (not shown) the rib 36 supports the insertion member 30 and resists deflection of the insertion member 30. The insertion member 30 includes opposing steps 34 and rotation stops 32. The insertion member 30 as shown is hollow and includes a bias region 40 between insertion edges 38 so that as the insertion edges 38 contact a socket the insertion edges 38 may flex to form a connection.

Figure 9:
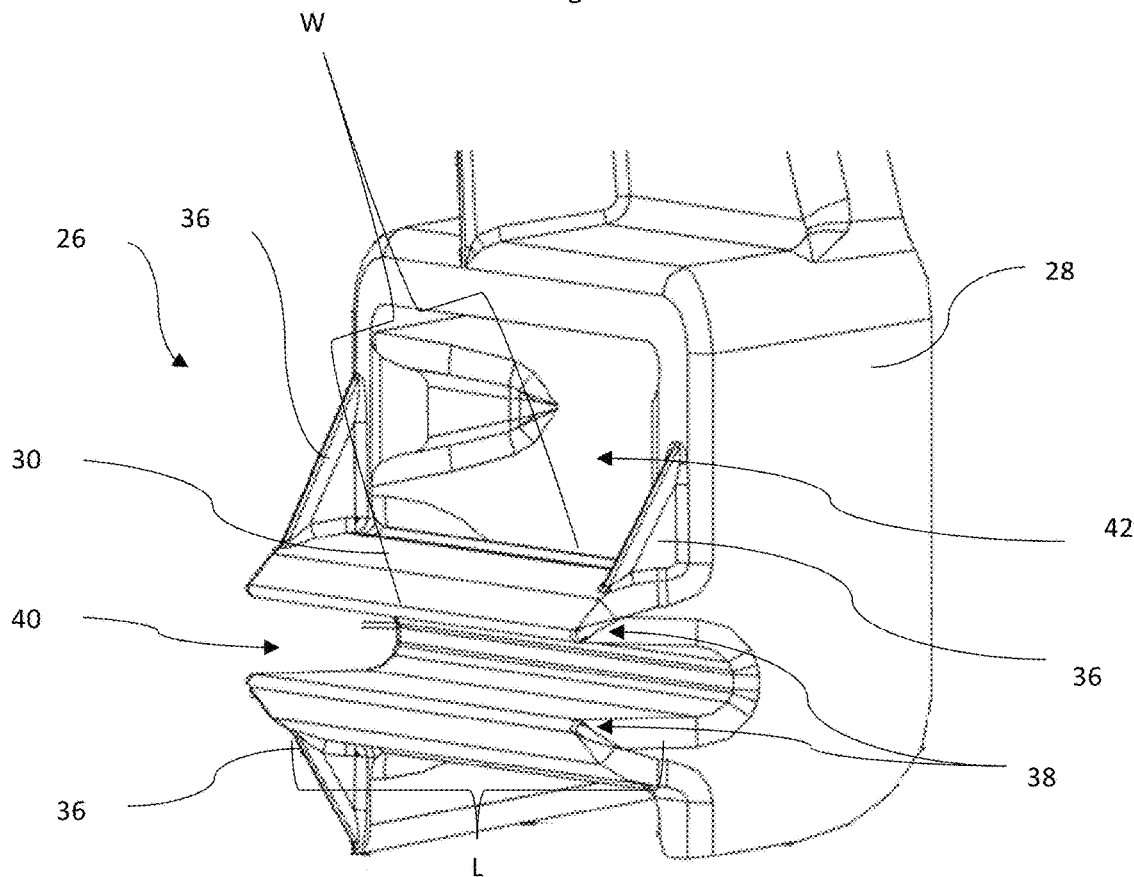
FIG. 9 is a close-up front perspective view of a pivot rod.

FIG. 9 is a close-up view of a front side of the first rod 26. The first rod 26 includes an insertion member 30 having insertion edges 38 separated by a bias region 40. The insertion member 30 is supported by ribs 36. The insertion member 30 includes a length (L) and a width (W). The insertion member 30 is connected to a support bridge 28 that connects to an end of the insertion member 30 and forms an opening 42 between the support bridge 28 and the insertion member 30.

Figure 10:
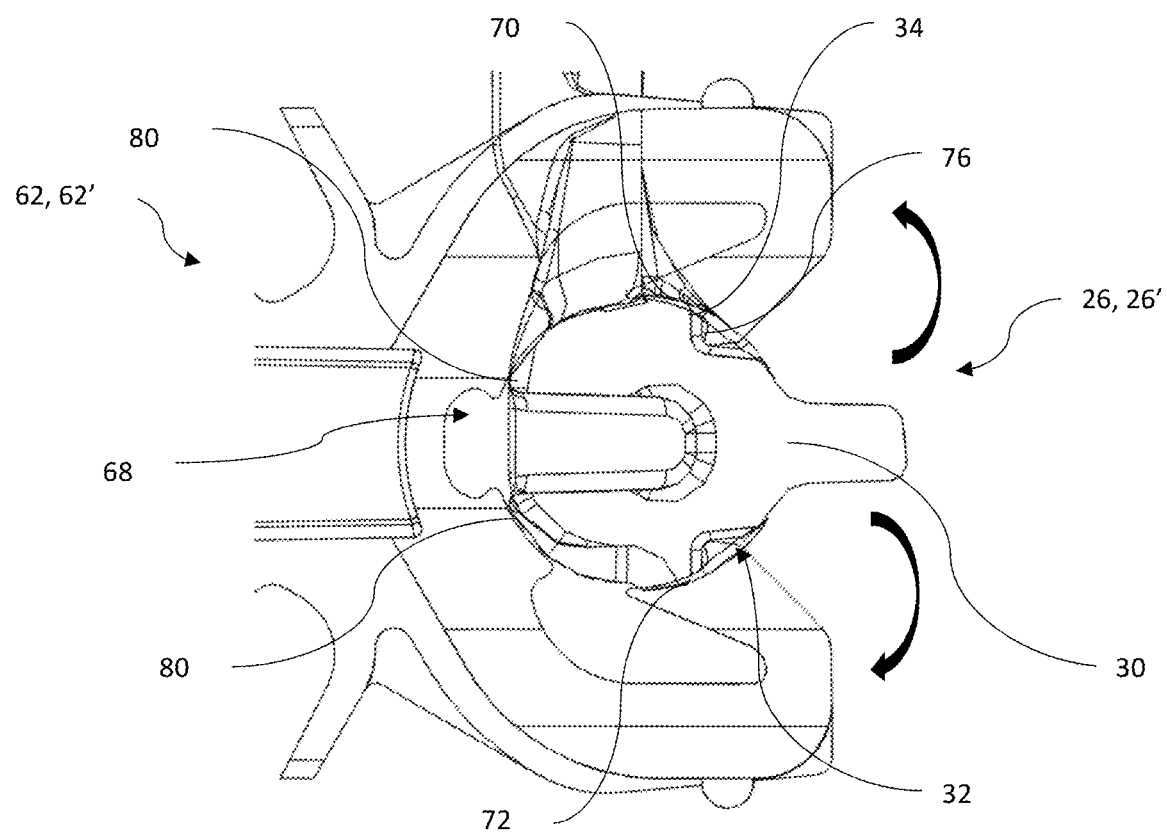
FIG. 10 is a side view of a pivot rod inserted into a socket.

FIG. 10 is a cross-sectional view of a rod 26, 26' extending into a receptacle 68 of the socket 62, 62' into contact with the upper seat 70, lower seat 72, and rear seats 80. The rod 26, 26' includes rotation stops 32 and steps 34 that receives a flex tab 76 that provides a restriction to an amount of rotation of the rod 26, 26' within the socket 62, 62' as shown by the arrow.

Figure 11:
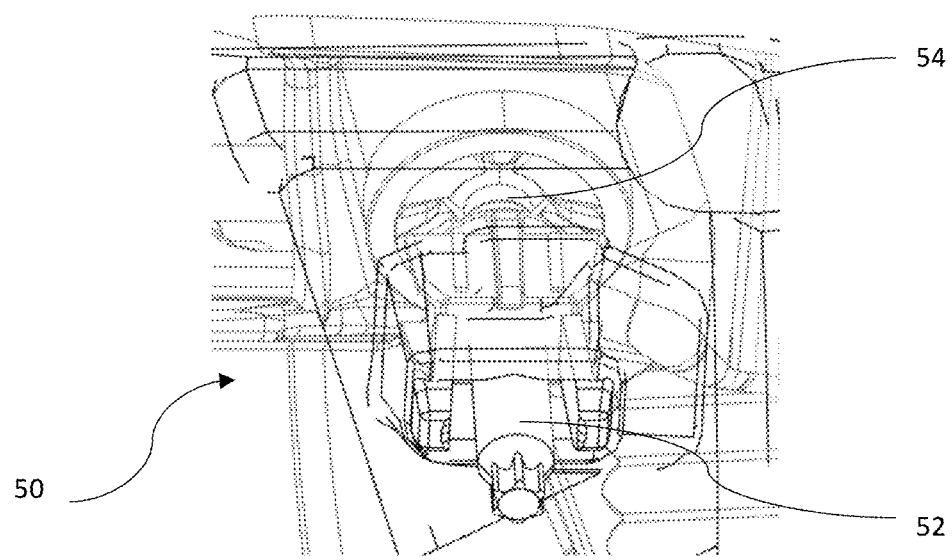
FIG. 11 is a rear view of a movement assembly.

FIG. 11 is a close-up view of a movement assembly 50. The movement assembly 50 includes an adjustment device 52 that moves a movement member 54 so that the reflector housing is adjusted within the connector housing (not shown).

Figure 12:
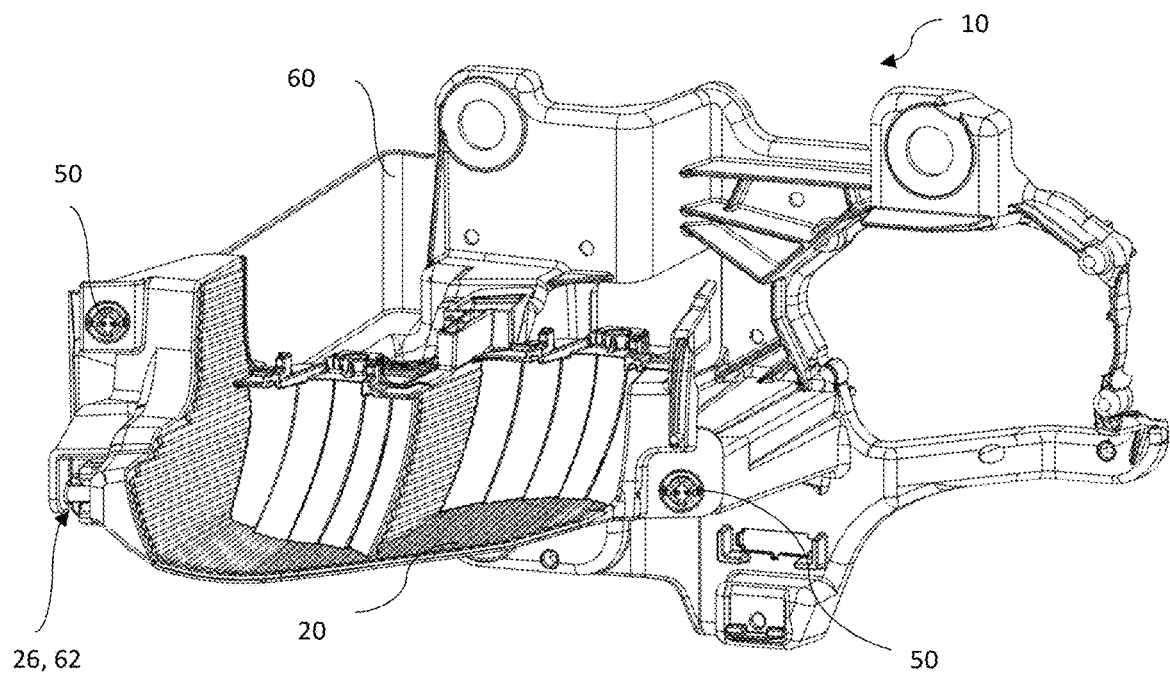
FIG. 12 is a front perspective view of a light system and a reflector housing.

FIG. 12 illustrates a light system 10 comprising a reflector housing 20 and connector housing 60 connected together by a rod 26 extending into a socket 62. The light system 10 includes movement assemblies 50 that adjust the reflector housing 20 relative to the connector housing 20 in the x-direction and the y-direction.

Figure 13:
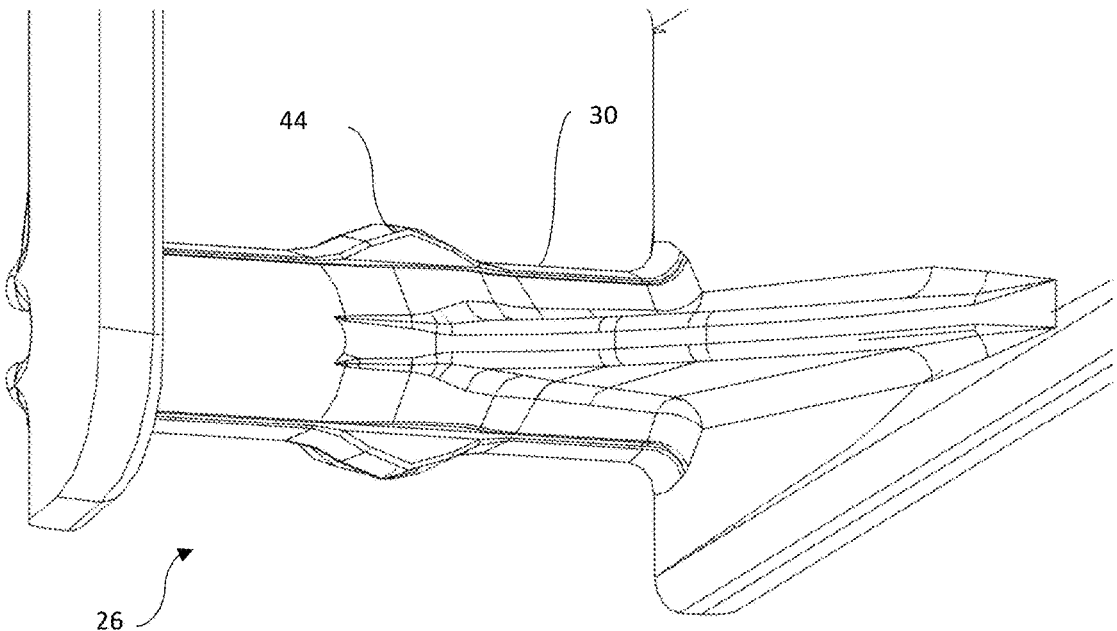
FIG. 13 is a close-up view of a pivot rod.

FIG. 13 illustrates rod 26 having an insertion member 30 having a pivot member 44 that permits adjusting in the x-direction and the y-direction while maintaining a secure connection.

Figure 14A:
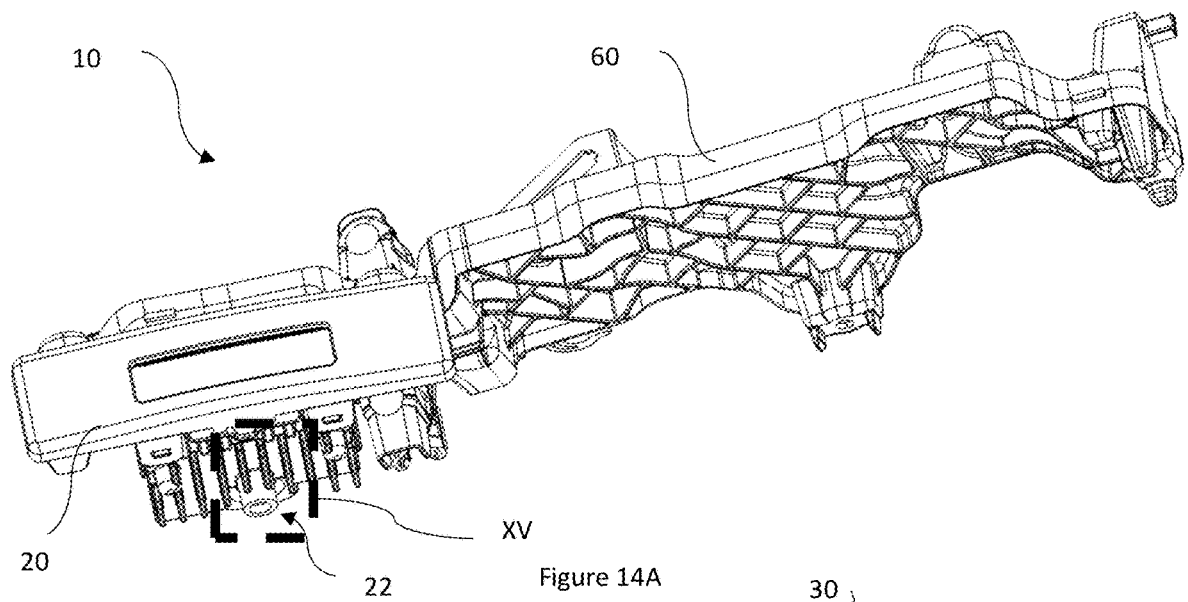
FIG. 14A is a bottom perspective view of a light assembly.

FIG. 14A is a perspective view of a light system 10 having a reflector housing 20 connected to and movable relative to a connector housing 60 via a movement assembly 22.

Figure 14B:
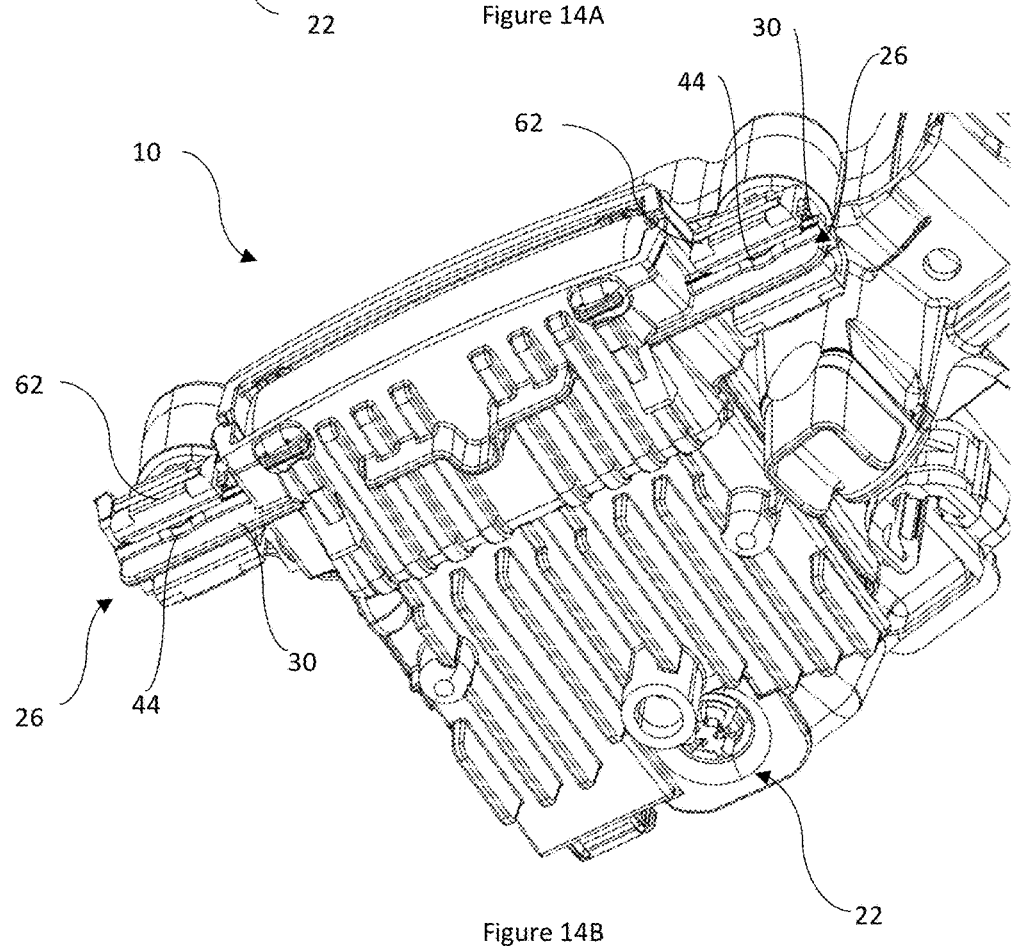
FIG. 14B is a close-up bottom perspective view of the light assembly of FIG. 14A with a reflector housing removed.

FIG. 14B is a bottom perspective view of the light system 10 with a portion of the reflector housing 20 removed. As shown, a rod 26 is connected within a socket 62. The rod 26 includes an insertion member 30 and a pivot member 44 so that the reflector housing 20 is movable relative to the connector housing 60 about the rod 26 and pivot member 44. The reflector housing 20 is pivotably about three points of movement with the adjustment assembly 22 being a third movement point for the reflector housing 20.

Figure 15:
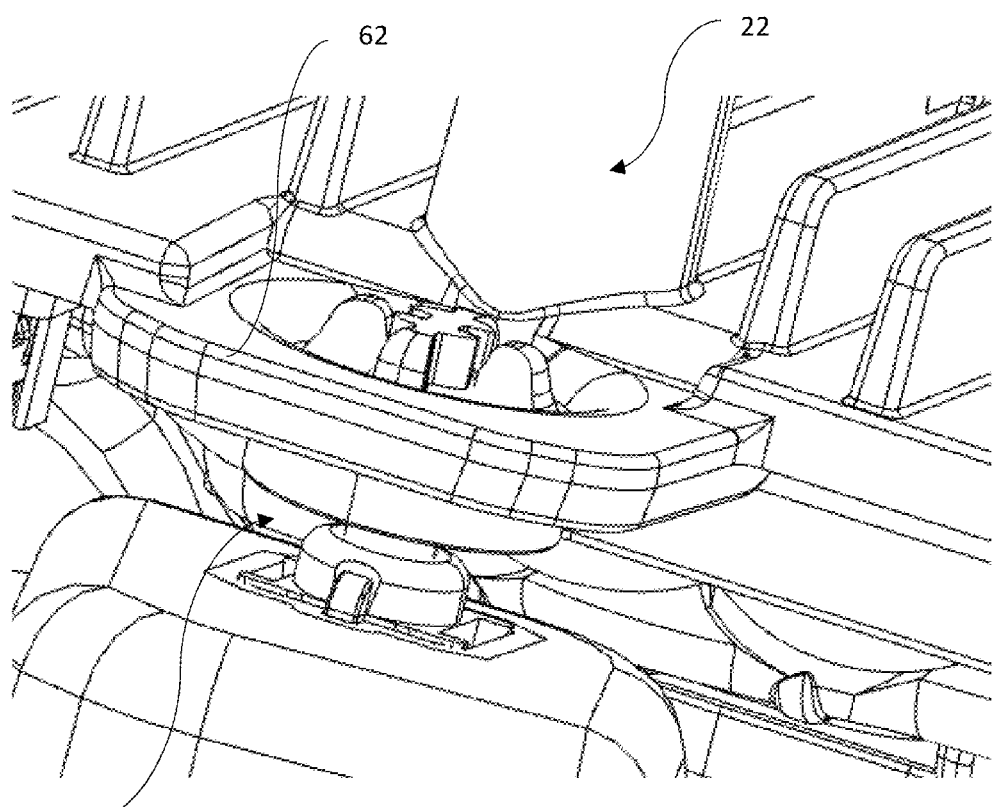
FIG. 15 is a close-up view of a socket and pivot within the light system of FIG. 14A in box XV.

FIG. 15 is a close-up view of an adjustment assembly 22 having a pivot member 44 located within a socket 62 so that the reflector housing 20 is movable relative to the connector housing 60 shown in FIG. 14.

Figure 16:
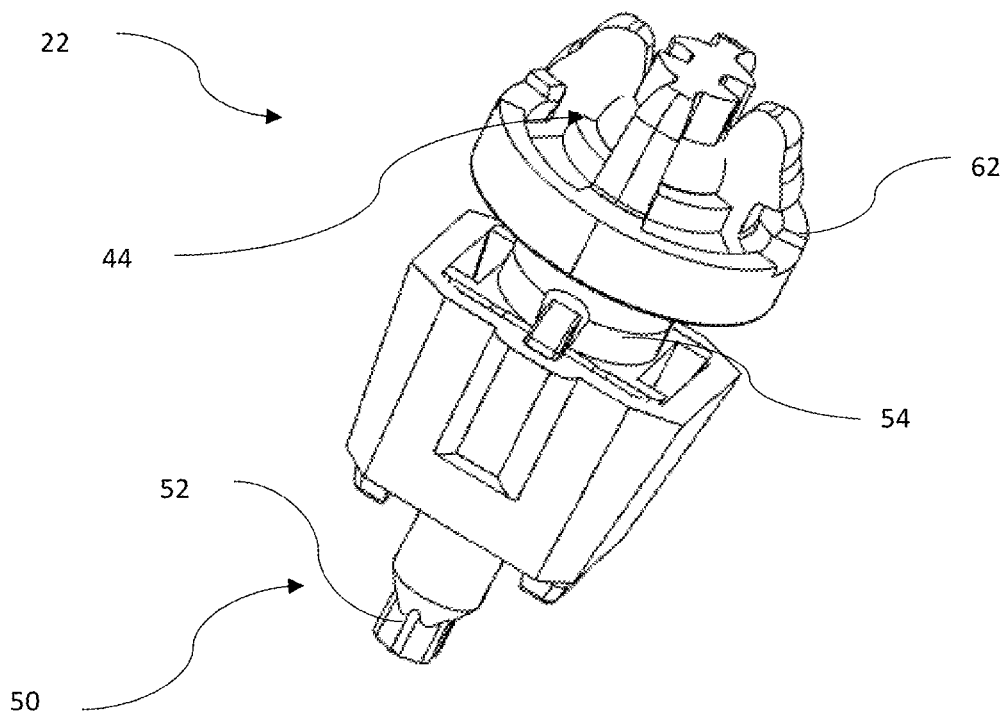
FIG. 16 is a close-up view of a socket and pivot.

FIG. 16 illustrates a joint adjustment assembly 22 and movement assembly 50. The adjustment assembly 22 has a pivot member 44 located within and movable relative to a socket 62. The adjustment assembly 22 also serves as a movement assembly 50. The movement assembly 50 has an adjustment device 52 that moves the movement member 54 axially to move the pivot member 44 within the socket 62.

Figure 17:
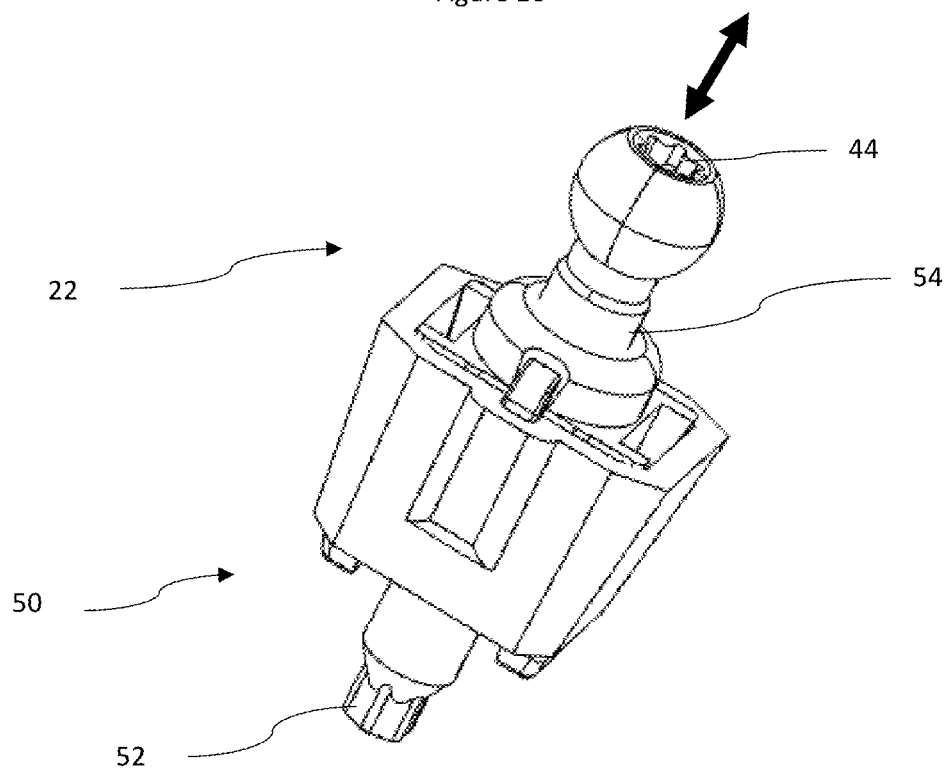
FIG. 17 is a close-up view of a pivot.

FIG. 17 illustrates the joint adjustment assembly 22 and movement assembly 50. The adjustment assembly 22 has a pivot member 44 that is movable by the movement assembly 50. The movement assembly 50 is movable in the directions of the arrow by the adjustment device 52 being rotated so that the movement member 54 axially moves.

Variation 1 comprises: a light system comprising: a light system of a vehicle comprising: (a) a connector housing; (b) a reflector housing connected to the connector housing and being movable relative to the connector housing; (c) one or more adjustment assemblies comprising: (i) a socket in the connector housing; and (ii) a rod in the reflector housing that extends into the socket and is rotatable relative to the socket so that the reflector housing is adjustable relative to the connector housing; and wherein the rod has a length and a width with the length being greater than the width and the rod being rotatable around an axis of the length.

Variation 2 may comprise the light system of variation 1, further comprising a movement assembly that adjusts the one or more adjustment assemblies and maintains a position of the one or more adjustment assemblies once the one or more adjustment assemblies are set in an aimed position.

Variation 3 may comprise the light system of any of variations 1-2, wherein the rod connects to the reflector at a first end and extends outward from the reflector and the rod includes a support bridge that connects to a second end and supports the rod.

Variation 4 may comprise the light system of variation 3 or any of variations 1-3, wherein the rod includes an insertion member and a space is located between the insertion member and the support bridge.

Variation 5 may comprise the light system of any of variations 1-4, wherein the rod includes an insertion member and the insertion member comprises one or more insertion edges that are configured to extend into the socket.

Variation 6 may comprise the light system of variation 5 or any of variations 1-5, wherein the one or more insertion edges form a tapered surface that extends into a recess of a the socket in a first direction so that the socket is gradually biased and once the insertion member is located within the socket the insertion member is restricted from moving in a second direction that is opposite the first direction.

Variation 7 may comprise the light system of variation 5 or any of variations 1-6, wherein the one or more insertion edges are two insertion edges and the insertion edges are separated by a bias region.

Variation 8 may comprise the light system of variation 5 or any of variations 1-7, wherein the one or more insertion edges include a rotation stop and a step that form a negative space in the one or more insertion edges that receives a portion of the socket.

Variation 9 may comprise the light system of variation 8 or any of variations 1-8, wherein a flex tab of the socket extends into the negative space and contacts the step when rotated in a first direction and contacts the rotation stop when rotated in a second direction.

Variation 10 may comprise the light system of variation 5 or any of variations 1-9, wherein the insertion member has one or more ribs on a forward side, a rearward side, or both.

Variation 11 may comprise the light system of variation 5 or any of variations 1-10, wherein all or a portion of the insertion member is hollow.

Variation 12 may comprise the light system of variation 5 or any of variations 1-11, wherein the insertion member is solid.

Variation 13 may comprise the light system of variation 5 or any of variations 1-12, wherein the insertion member has a generally circular, oval, or teardrop cross-sectional shape.

Variation 14 may comprise the light system of any of variations 1-13, wherein the rod includes an insertion member and a length of the insertion member is greater than a width of the insertion member.

Variation 15 may comprise the light system of variation 14 or any of variations 1-14, wherein a ratio of the length to the width of the rod is about 1.5:1 or more and about 10:1 or less.

Variation 16 may comprise the light system of variation 14 or any of variations 1-15, wherein the insertion member includes one or more pivot members located along the length of the insertion member.

Variation 17 may comprise the light system of variation 16 or any of variations 1-16, wherein the one or more pivot members extend outward from the insertion member so that the socket pivotable relative to the insertion member in a second direction.

Variation 18 may comprise the light system of variation 16 or any of variations 1-17, wherein the one or more pivot members are generally circular, diamond shaped, are triangles that extend outward from the insertion members, or a combination thereof.

Variation 19 may comprise the light system of any of variations 1-18, wherein one or more of the one or more adjustment assemblies is both an adjustment assembly and a movement assembly.

Variation 20 may comprise the light system of variation 19 or any of variations 1-19, wherein the movement assembly moves a pivot member relative to the socket so that the reflector housing is adjusted relative to the connector housing.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Direction of movement
10 Light System
12 Light Source
14 Light
16 Lens
20 Reflector Housing
22 Adjustment Assembly
24 Primary Reflector Surface
24' Secondary Reflector Surface
26 Rod
28 Support Bridge
30 Insertion Member
32 Rotation Stop
34 Step
36 Rib
38 Insertion Edge
40 Bias Region
42 Opening
44 Pivot Member
50 Movement Assembly
52 Adjustment Device
54 Movement Member
60 Connector Housing
62 Socket
64 Upper Jaw
66 Lower Jaw
68 Receptacle
70 Upper Seat
72 Lower Seat
74 Flex Region
76 Flex Tab
78 Anti-Retraction Tab
80 Rear Seat
82 Flex Cavity

We claim:

1. A light system of a vehicle comprising:
a. a connector housing;
b. a reflector housing connected to the connector housing and being movable relative to the connector housing;
c. one or more adjustment assemblies comprising:
  i. a socket in the connector housing, wherein the socket has a "U" shape or a "C" shape forming an opening; and
  ii. a rod in the reflector housing that extends into the socket and is rotatable relative to the socket so that the reflector housing is adjustable relative to the connector housing, wherein the rod comprises:
    an insertion member with a generally circular, oval, or a teardrop cross-sectional shape to assist the rod in extending into the socket, wherein the insertion member comprises:
      a leading side;
      a trailing side that follows the leading side as the insertion member extends into the socket;
      rotation stops located within the trailing side; and
      steps located within the trailing side adjacent the rotation stops; and
    wherein the rotation stops and the steps form negative spaces therebetween that receive a portion of the socket;
    wherein the rod has a length and a width with the length being greater than the width and the rod being rotatable around an axis of the length; and
    wherein the leading side extends lengthwise along the length of the rod so that the rod extends lengthwise into the opening of the socket.

2. The light system of claim 1, further comprising a movement assembly that adjusts the one or more adjustment assemblies and maintains a position of the one or more adjustment assemblies once the one or more adjustment assemblies are set in an aimed position.

3. The light system of claim 1, wherein the rod comprises:
a first end and
a second end opposite the first end, wherein the rod connects to the reflector at the first end and extends outward from the reflector and connects to a support bridge at the second end that supports the rob.

4. The light system of claim 3, wherein a space is located between the insertion member and the support bridge.

5. The light system of claim 1, wherein the insertion member comprises one or more insertion edges at the leading side that are configured to extend into the socket first to assist in connecting the socket and rod together.

6. The light system of claim 5, wherein the one or more insertion edges form a tapered surface at the leading side of the insertion member that extends into a recess of the socket in a first direction so that the socket is gradually biased, and once the insertion member is located within the socket the insertion member is restricted from moving in a second direction that is opposite the first direction.

7. The light system of claim 5, wherein the one or more insertion edges are two insertion edges and the insertion edges are separated by a bias region.

8. The light system of claim 5, wherein the rotation stops and the steps are part of the insertion member.

9. The light system of claim 8, wherein the insertion member comprises:
a first rotation stop and a first of the steps on a first side and
a second rotation stop and a second of the steps on a second side; and
wherein a first flex tab of the socket extends into the negative spaces and contacts the first of the steps when the insertion member is rotated in a first direction and a second flex tab contacts of the second of the rotation stops when rotated in a second direction.

10. The light system of claim 5, wherein the insertion member has one or more ribs on a forward side, a rearward side, or both.

11. The light system of claim 5, wherein all or a portion of the insertion member is hollow.

12. The light system of claim 5, wherein the insertion member is solid.

13. The light system of claim 1, wherein the insertion member comprises a length that is greater than a width of the insertion member.

14. The light system of claim 13, wherein a ratio of the length to the width of the rod is about 1.5:1 or more and about 10:1 or less.

15. The light system of claim 1, wherein one or more of the one or more adjustment assemblies is both an adjustment assembly and a movement assembly.

16. The light system of claim 15, wherein the movement assembly moves a pivot member relative to the socket so that the reflector housing is adjusted relative to the connector housing.

17. A light system of a vehicle comprising:
a) a connector housing;
b) a reflector housing connected to the connector housing and being movable relative to the connector housing;
c) one or more adjustment assemblies comprising:
 i) a socket in the connector housing having an opening so that the socket forms a "U" shape or a "C" shape; and
 ii) a rod in the reflector housing that extends into the socket and is rotatable relative to the socket in a first direction so that the reflector housing is adjustable relative to the connector housing; and
 iii) an insertion member located on and extending from the rod to guide the rod into the socket, wherein the insertion member comprises:
  a cross-sectional shape that is generally circular, oval, or teardrop;
  one or more pivot members located along a length of the insertion member and forming a raised portion on an outer surface of the insertion member; and
  wherein the rod extends into the opening of the socket lengthwise so that the length of the rod is in communication with the socket along a length of the socket.

18. The light system of claim 17, wherein the socket is pivotable relative to the insertion member in a second direction, wherein the first direction rotates about an x-axis and the second direction rotates about a y-axis.

19. The light system of claim 17, wherein the one or more pivot members are generally circular, diamond shaped, are triangles that extend outward from the insertion members, or a combination thereof.

20. The light system of claim 17, wherein the rod comprises:
a first end;
a second end opposite the first end, wherein the rod connects to the reflector at the first end and extends outward from the reflector and connects to a support bridge at the second end that supports the rod; and
a space is located between the insertion member and the support bridge.

* * * * *